US008475901B2

(12) United States Patent
Viavattine et al.

(10) Patent No.: US 8,475,901 B2
(45) Date of Patent: Jul. 2, 2013

(54) SECURE PHARMACY DISPENSING UNI-FORM FOR DIGITAL PRINTERS

(75) Inventors: John Michael Viavattine, Rochester, NY (US); Kurt Warren Jones, Denver, CO (US)

(73) Assignee: Xerox Corporation, Norwalk, CT (US)

( * ) Notice: Subject to any disclaimer, the term of this patent is extended or adjusted under 35 U.S.C. 154(b) by 790 days.

(21) Appl. No.: 12/357,851

(22) Filed: Jan. 22, 2009

(65) Prior Publication Data

US 2010/0181756 A1 Jul. 22, 2010

(51) Int. Cl.

| | |
|---|---|
| ***B32B 3/24*** | (2006.01) |
| ***B32B 5/00*** | (2006.01) |
| ***B32B 7/14*** | (2006.01) |
| ***B42D 15/00*** | (2006.01) |
| ***G09F 3/02*** | (2006.01) |
| ***G09F 3/10*** | (2006.01) |
| ***B65D 27/00*** | (2006.01) |
| ***B65D 27/04*** | (2006.01) |
| ***B65D 27/14*** | (2006.01) |
| *B32B 37/12* | (2006.01) |

(52) U.S. Cl.

USPC ....... 428/42.1; 428/40.1; 428/42.2; 428/42.3; 428/43; 428/54; 428/55; 428/56; 428/57; 428/81; 428/131; 428/137; 428/195.1; 428/201; 53/452; 53/460; 53/467; 229/71; 229/80; 283/81; 283/101; 283/105; 283/900

(58) Field of Classification Search

None

See application file for complete search history.

(56) References Cited

U.S. PATENT DOCUMENTS

| | | | | |
|---|---|---|---|---|
| 4,189,053 | A * | 2/1980 | Stagnitto et al. | 206/570 |
| 4,211,434 | A * | 7/1980 | Reese | 229/69 |
| 4,461,661 | A * | 7/1984 | Fabel | 156/70 |
| 4,708,285 | A | 11/1987 | Segall | |
| 5,238,183 | A | 8/1993 | Sauerwine | |
| 5,328,208 | A * | 7/1994 | Garrison | 283/105 |
| 5,582,298 | A | 12/1996 | Clayton et al. | |
| 5,924,738 | A | 7/1999 | Konkol et al. | |
| 6,027,014 | A * | 2/2000 | Cochran | 229/70 |

(Continued)

FOREIGN PATENT DOCUMENTS

| | | |
|---|---|---|
| DE | 19710356 A1 * | 10/1997 |
| EP | 0924676 | 6/1999 |
| WO | 9925565 | 5/1999 |

OTHER PUBLICATIONS

Machine Translation of DE 197 10 356 A1, Oct. 1997.*

European Patent Office, European Search Report, European Application No. 10150964.4, Sep. 6, 2010, 3 Pages.

*Primary Examiner* — David Sample

*Assistant Examiner* — Jeff Vonch

(74) *Attorney, Agent, or Firm* — MH2 Technology Law Group LLP

(57) ABSTRACT

A method and resulting multi-layered media product including a printed layer and a liner layer having inner surfaces adhered together with a clear poly material sandwiched therebetween. The multi-layered media product includes a first section separable from a remainder of the product and containing printed indicia thereon, a second section separable from a remainder of the product and having a removable printed label thereon, and a third section convertible to an envelope. The third section contains printed indicia on one side thereof and a window of the clear poly material on another side thereof. In operation, the sections of the multi-layered media product are separated and a labeled container can be placed in the envelope and the envelope sealed to prevent tampering.

12 Claims, 4 Drawing Sheets

U.S. PATENT DOCUMENTS 6,167,679 B1 * 1/2001 Horton-Steidle et al. ...... 53/411
6,173,888 B1 * 1/2001 Fabel .............................. 229/71
6,254,952 B1 * 7/2001 Fox et al. ..................... 428/40.1
6,258,428 B1 * 7/2001 Phillips et al. ............... 428/42.1
6,304,849 B1 * 10/2001 Uecker et al. ..................... 705/3
6,626,464 B1 * 9/2003 Flaherty et al. ................. 283/81
6,701,654 B2 * 3/2004 Rappaport et al. .............. 40/776
6,715,796 B2 * 4/2004 Foote et al. ..................... 283/67
6,994,899 B2 * 2/2006 McClelland et al. ........ 428/40.1

* cited by examiner

SECURE PHARMACY DISPENSING UNI-FORM FOR DIGITAL PRINTERS

DESCRIPTION OF THE INVENTION

1. Field

The present disclosure generally relates to secure packaging of a product and method of forming the same. More particularly, exemplary embodiments relate to a multi-layer printable form, the printed form convertible to a detachable dispensing envelope, detachable slip, and detachable waste paper.

2. Background

In the field of medication dispensing, and particularly in dispensing medications from a pharmacy, accurately coordinating prescription data with their respective containers can become problematic. Typically, three separate documents including two with media thereon are printed to complete a prescription order. These three documents can include a label stock for a medication container, and two prescription ("script") forms. Upon separately printing these three documents, the documents must be manually merged with a correct medication container. One label is adhered to the medication container and another label is used as the script form. The script form is stapled to some type of receptacle, typically a bag. A duplicate script form (e.g. the third document) is retained to a file within the pharmacy from which the prescription is dispensed. Having multiple documents, which are separately printed, and each of which serves a separate purpose, can lead to error in dispensing.

In a hospital environment, the bag with medication is delivered to the responsible floor nursing staff and then dispensed to a patient. Typically the delivered bag is not secure and the medication can easily be removed at any point during transport. Unless the medication is later carefully verified by comparing the label on the medication with the label on the script form stapled to the bag, a patient may receive the wrong medication or the medication could be removed or otherwise tampered with prior to dispensing to the patient.

These procedures have long been in practice without significant alteration or advances in secure medication dispensing and/or transport. Medication dispensing should be free of document merge errors and secure throughout the process of filling an original prescription by a pharmacist and technicians to a final patient delivery. To date, no device or methods have been established which satisfy these needs.

Thus, there is a need to overcome these and other problems of the prior art and to provide a method and device, each of which provides a multi-layered printed media product, convertible to a secure delivery envelope, that will eliminate the need for multiple forms in an originating pharmacy for the dispensing of medications. The digital optimized media will eliminate merge errors and a created security envelope will provide a secure receptacle for transporting medication to administering hospital staff without concern of tampering.

SUMMARY

In accordance with the present teachings, a convertible multi-layer media product is provided.

The exemplary convertible product can include a printed layer, the printed layer comprising—three separable sections, each section having an outer surface and an inner surface, a first section including printed indicia on the outer surface, a second section including a die cut label therethrough, and a third section including printed indicia on the outer surface and a die cut peel strip therethrough intermediate the printed indicia and an adjacent section; a liner layer aligned and coupled with said printed layer, said liner layer comprising—three separable sections corresponding to the three separable sections of the printed layer, each section having an outer surface and an inner surface, a first section including adhesive on the inner surface, a second section including a release material on the inner surface, and the third section including a removable die cut area defining an opening inset from outer edges, adhesive adjacent outer edges of the inner surface, and a release material intermediate the removable die cut area and an adjacent section; and a see-through film sandwiched between inner surfaces of the printed layer and the liner layer at the third sections thereof, the film including an adhesive at outer edges thereof on a face oriented toward the printed layer.

In accordance with the present teachings, a method of forming a convertible multi-layer media product is provided.

The exemplary method can include forming a printed layer, forming said printed layer comprising—forming three separable sections, each section having an outer surface and an inner surface; printing indicia on the outer surface of a first section; printing a removable label on the outer surface of a second section; and printing indicia on the outer surface of a third section; and forming a liner layer and coupling the liner layer with said printed layer, forming said liner layer comprising—forming three separable sections corresponding to the three separable sections of the printed layer, each section having an inner surface and an outer surface; applying adhesive to the inner surface of a first section; applying a release layer to an inner surface of a second section; providing a die cut defining an opening set in from outer edges of a third section; applying adhesive adjacent outer edges of the third section inner surface; providing a release material in a flap portion intermediate the removable die cut area and an adjacent section; providing a see-through film spanning the cut out opening and affixed to the adhesive at outer edges of the film; and forming a peel strip over a silicone release surface adjacent a separation border of the third section.

In accordance with the present teachings, the multi-layer media product is convertible to a product containing envelope by detaching each of the adhesively joined first and second sections, removing the die cut label from the second section, applying the die cut label to a medication container, filling the medication container, inserting the filled and labeled medication container into the envelope between the see-through film and printed layer, removing the peel strip, and folding the flap portion over the outer surface of the printed layer in the third section.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF EMBODIMENTS

Reference will now be made in detail to exemplary embodiments of the invention, examples of which are illustrated in the accompanying drawings. However, one of ordinary skill in the art would readily recognize that the same principles are equally applicable to, and can be implemented in devices other than medication packaging, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents. Wherever possible, the same reference numbers will be used throughout the drawings to refer to the same or like parts.

Embodiments pertain generally to a multi-layered media product and more particularly to a multi-layer media product convertible to a secure pharmacy envelope, including exemplary methods of forming the same. Although the embodiments are described in connection with structures for a multi-layer media product, a resulting secure pharmacy envelope, and methods of forming, it will be appreciated that the multi-layer media product can be any variety of printed matter including labeling and can be used for packaging of products other than prescriptions generated at a pharmacy, by way of non-limiting examples.

Figure 1:
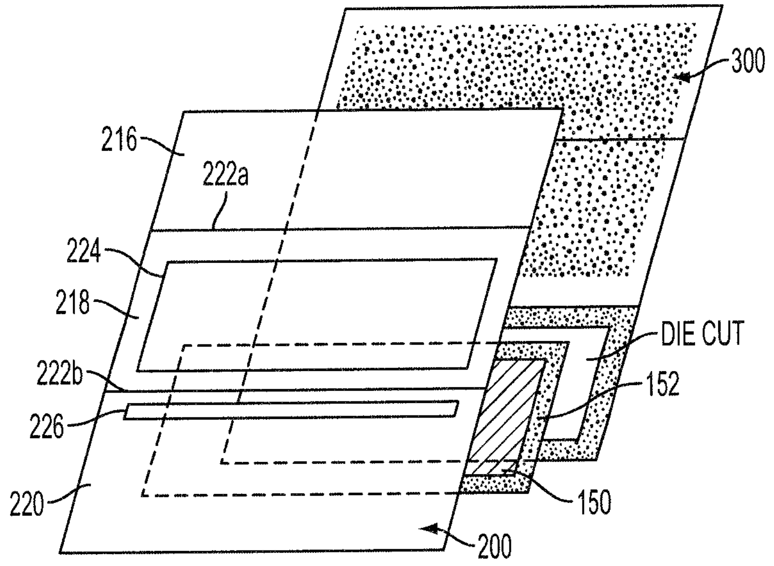
FIG. 1 is an exploded perspective view of a multi-layer media product in accordance with embodiments of the present teachings.

An exemplary multi-layer media product 100 is depicted in FIG. 1. The multi-layer media product 100 can include a printed layer 200, a liner layer 300 and a window layer 150. Although the relationships of components are described in general terms, it will be appreciated that one of skill in the art can add, remove, or modify certain components without departing from the scope of the exemplary embodiments.

Figure 2A:
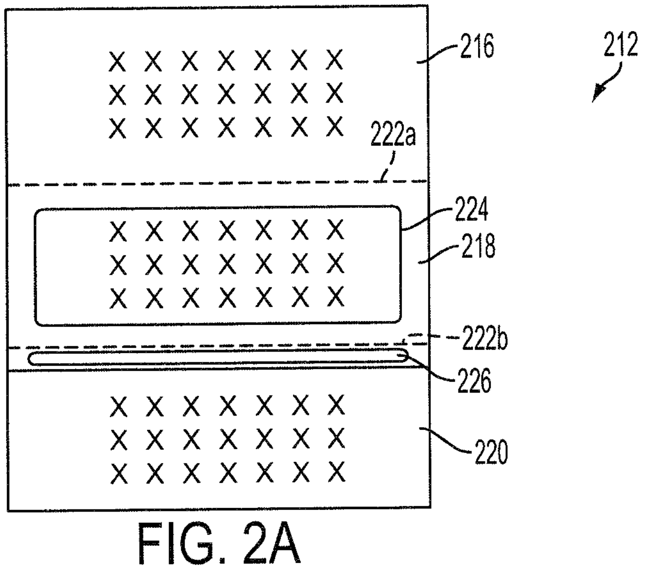
FIG. 2A is a top view and FIG. 2B is a bottom view, respectively, of a printed layer of the multi-layer media product in accordance with embodiments of the present teachings.
Figure 2B:
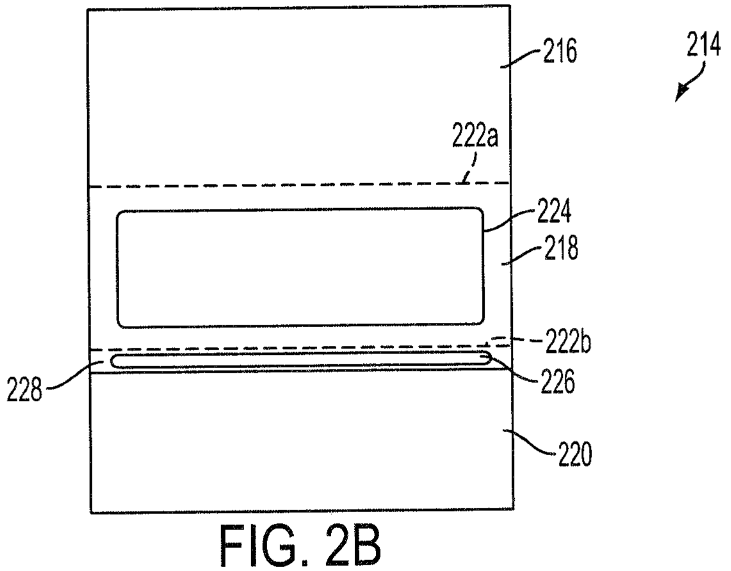

Reference can be made to FIG. 1 as well as FIG. 2A and FIG. 2B depicting inner and outer surfaces when describing the components of the printed layer 200. More specifically, the printed layer 200 can include an outer printed surface 212 (FIG. 2A) and an inner non-printed surface 214 (FIG. 2B). The printed layer 200 can be configured with three separate sections 216, 218, and 220. A perforation 222 can be formed between adjoining sections, for example between 216 and 218, and between 218 and 220 in order to enable separation of a section from a remainder of the printed layer 200, and accordingly from a remainder of the media product 100. Any suitable perforation can be used, including a micro-perforation, but it will be appreciated that the perforation should withstand handling and prevent removal of a section until the multi-layer media product 100 is converted to an envelope as will be described farther in connection with FIG. 4. It will be appreciated that the sections are labeled for ease of description and that their relative relationship can be other than that described.

Each section 216, 218, 220 can receive printed indicia. Printed indicia can be applied with a conventional printer or other suitable means for transferring pertinent data to a printed side of the printed layer. The printed indicia can be the same or can be varied according to a particular need. Each of the printed sections 216, 218, 220 can be separated at the perforations 222*a*, 222*b* to perform subsequent distinct functions. By way of example, each section 216, 218, 220 can receive printed indicia on the outer surface 212 thereof which indicia corresponds to prescription information of a particular patient. A pharmacist can utilize the printed indicia to fill a prescription because the printed media product 100 can be in proximity to the pharmacist while dispensing a prescription product into a container, thus further limiting potential error.

In addition, the middle section 218 can include a die cut label 224 therein, upon which indicia can be printed. The die cut label 224 can be removed from the middle section 218 as will be described in further detail below. A size of the die cut label 224 can be determined according to an overall size of the media product 100. In some embodiments, the label 224 can encompass an entirety of the middle section 218.

The third section 220 can include a die cut peel off strip 226. The die cut peel off strip 226 can be positioned adjacent an upper edge of the third section 220 and between the printed indicia area of the outer side of the printed layer 200 and the perforation 222*b* between the second 218 and third 220 sections.

The inner surface 214 of the printed layer 200 can be substantially free of indicia, adhesives or the like, and is essentially a blank side of the printed layer with the exception of a release material 228 formed on an inner surface 214 of the third section 220. For example, in the exemplary embodiment, the release material 228, such as a silicone release material, can be formed on the inner surface 214 of the printed layer 200 in a location of the peel strip 226 in order to detach the peel strip from adhesive formed on the inner surface of the liner layer 300 as will be described in the following.

However, it will be appreciated that description below of adhesives and release materials formed on an inner surface of the liner layer 300 can instead or additionally be applied to suitable areas of the inner surface of the liner layer according to assembly equipment and preferences.

Although not limiting to the exemplary embodiments, the printed layer 200 can include digitally optimized paper stock, with a bias weight of 90 GSM. In addition, by way of example, the label 224 in the printed layer 200 can include a die cut of about 3.5×1.125 inches to form the label. The die cut peel strip 226 in the third section 220 of the printed layer 200 can be about 0.5×8.5 inches in dimension to form the peel strip on a flap of the formed envelope, as will be described in the following.

Figure 3A:
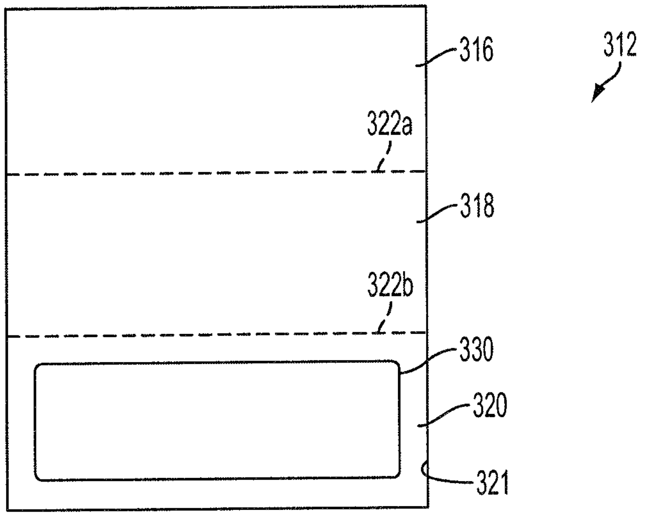
FIG. 3A is a top view and FIG. 3B is a bottom view, respectively, of a liner layer of the multi-layer media product in accordance with embodiments of the present teachings.
Figure 3B:
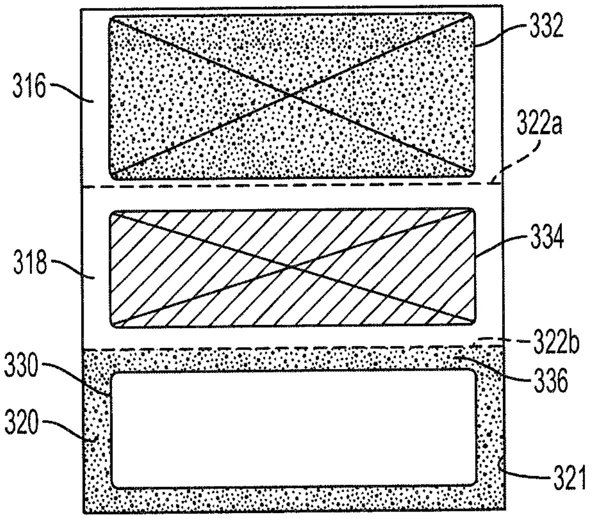

Reference can be made to FIG. 1 as well as FIG. 3A and FIG. 3B depicting inner and outer surfaces when describing the components of the liner layer 300. More specifically, the liner layer 300 can include an outer surface 312 and an inner surface 314. Typically, the liner layer 300 is free of indicia on either the inner 312 or outer 314 surfaces thereof.

Figure 4:
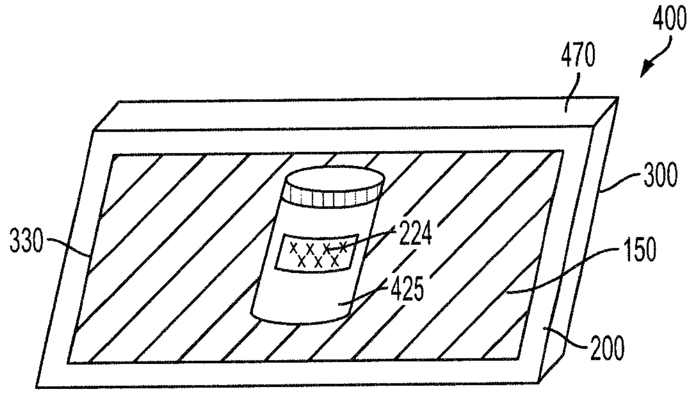
FIG. 4 is a perspective view illustrating an exemplary envelope converted from the multi-media product in accordance with embodiments of the present teachings.

The liner layer 300 can be configured with three separate sections 316, 318, and 320. A perforation 322 can be formed between adjoining sections, for example between 316 and 318, and between 318 and 320 in order to enable separation of a section from a remainder of the liner layer 300, and thus from a remainder of the multi-layer media product 100. Any suitable type of perforation can be used, including micro-perforation, but it will be appreciated that the perforation should withstand handling and prevent removal of a particular section until the multi-layer media product 100 is converted to assemble an envelope housing a prescription container (for example as depicted in FIG. 4 and described further below). It will also be appreciated that the sections are labeled for ease of description and that their relative positions with respect to each other can be different than that described. For example, the sections can be arranged such that the third section is between the first and second section, the first section is between the second and third section, and so on.

Each section 316, 318, 320 of the liner layer 300 can be separable at the perforation 322*a*, 322*b* to perform subsequent distinct functions. The third section 320 can include a die cut window 330 formed therein, the die cut window removable from a remainder of the third section 320 as will be described in further detail below. A size of the die cut window 330 can be determined according to an overall size of the media product 100 and according to a window size in the envelope 400 of FIG. 4. In some embodiments, the die cut 330 can encompass an entirety of the third section 320. By way of example, the die cut window 330 can be about 4.25×7.125 inches made into the liner layer 300; the die cut being removed to form a window opening.

Referring particularly to FIG. 3B, depicting the inner surface 314 of the liner layer 300, the first section 316 can include an adhesive 332 on the surface thereof. The adhesive 332 can cover an entire inner surface of the section 316 in order to provide maximum adhesion to a corresponding section 216 inner surface 214 of the printed layer 200. However, it will be appreciated that the adhesive can be applied in an effective amount without covering an entirety of the inner surface 314 of the first section 316. The adhesive can be applied by way of a pattern, such as a dot matrix, cross-hatch, lined, spot printed, or other suitable pattern and provide effective adhesion with the corresponding section 216 of the printed layer.

The inner surface 314 of the second section 318 of the liner layer 300 can include a release material 334, for example a silicone release material, formed, printed or otherwise disposed thereon. Typically, the release material 334 can cover an entire inner surface of the section 318, however, an area of the release material can be provided to substantially correspond to a size of the die cut label 224 in the aligned section 218 of the printed layer 200. The release material 334 can be applied by way of a pattern, such as a dot matrix, cross-hatch, lined, spot printed, or other suitable pattern and provide effective adhesion with the corresponding section 218 of the printed layer 200.

The inner surface 314 of the third section 320 of the liner layer 300 can include an adhesive perimeter 336 formed, printed or otherwise disposed adjacent an outer perimeter 321 of the section 320. The above described die cut window 330 can therefore be formed within the adhesive perimeter 336. The die cut window 330 can be removed from a remainder of the third section 320 in order to create a window opening in the section. The perimeter adhesive 336 can be, for example, a permanent rubber based adhesive recessed about 0.125 inches from an outer edge of the liner layer 300 to prevent adhesive ooze during fusing of the liner layer 300 to the printed layer 200.

Although not limiting to the exemplary embodiments, the liner layer 300 can include a 30-40 pound liner material.

In addition to the printed layer 200 and the liner layer 300, a window layer 150 can be provided in the multi-layer media product 100. The window layer 150 can include a clear poly material. The window layer 150 can be substantially the same size as the third sections 220, 320. Spot printed rubber based adhesive 152 can be applied to or otherwise formed adjacent the side and bottom edges of the window layer 150 to form a top entry pocket. The adhesive 152 can be formed on a surface of the window layer 150 facing an inner surface 212 of the printed layer 200. The adhesive can be about 0.5 inches wide and recessed about 0.125 inches from an outer edge to prevent adhesive ooze during fusing of the liner layer 300 to the printed layer 200. By way of example, the window layer can include a 2 mil PET material.

In exemplary embodiments, it will be appreciated that the sections 216, 218, 220 of the printed layer 200 are substantially aligned with the sections 316, 318, 320 of the liner layer 300, as the adhered printed layer 200 and liner layer 300 combine with the window layer 150 to form the overall multi-layer media product 100.

The multi-layer media product 100 can therefore include the window layer 150 sandwiched between inner surfaces 212, 312 of the printed layer 200 and the liner layer 300. More specifically, the inner surface 212 of the first section 216 of the printed layer 200 can adhere to the adhesive 322 of the inner surface 314 of the first section 316 of the liner layer 300; the inner surface 212 of the second section 218 of the printed layer 200 can adhere to the silicone release material 334 of the inner surface 314 of the second section 318 of the liner layer 300; and the inner surface 214 of the third section 220 of the printed layer 200, including the release material 228 thereof, can adhere to the perimeter adhesive 336 of inner surface 314 of the third section 320 of the liner layer 300. Further, the multi-layer media product 100 can be a relatively flat product having surfaces suitable for printing indicia thereon, including prescription indicia.

As a multi-layer media product 100, the overall dimensions can correspond to that of an 8½×11" sheet for easily feeding through a printer (not shown). However, it will be appreciated that various other dimensions of the multi-layer media product can be utilized without departing from the exemplary embodiments.

Figure 5:
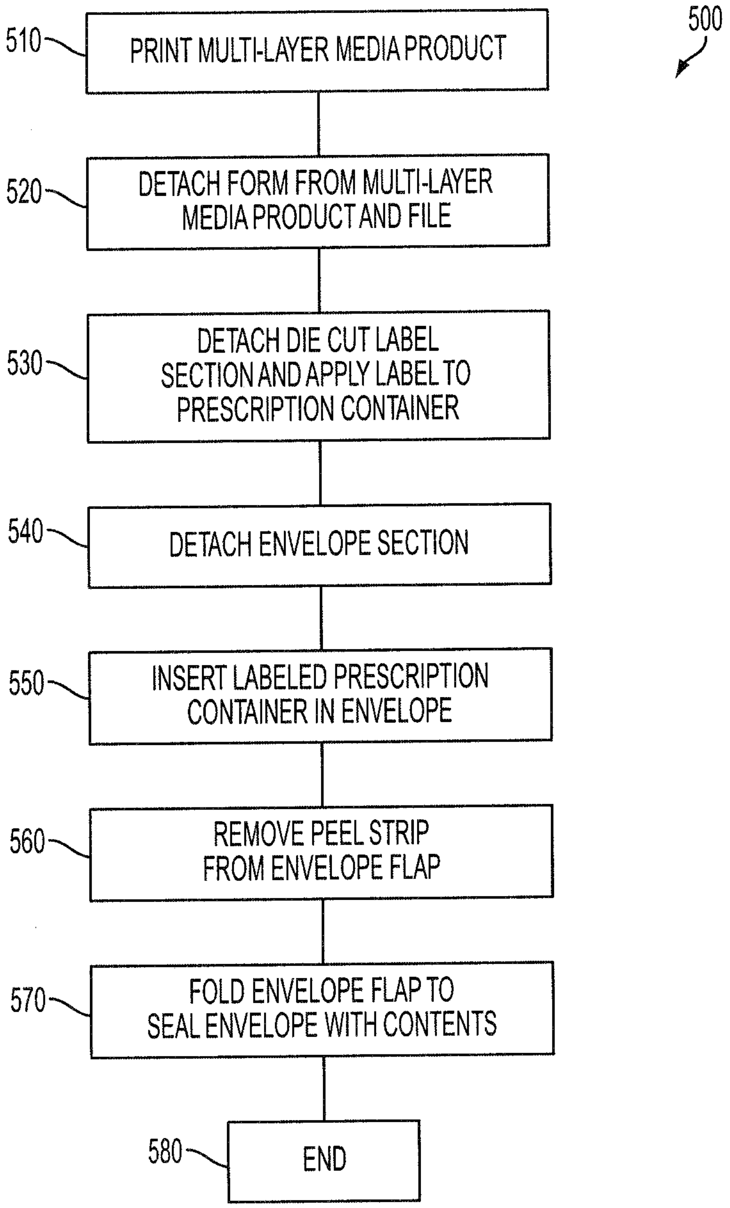
FIG. 5 is a flow chart depicting a method of assembling the envelope from the multi-media product in accordance with exemplary embodiments of the present teachings.

In operation, the multi-layer media product 100 can be converted to a secure envelope 400 containing a dispensed prescription in a container 425 as depicted in FIG. 4. Although the envelope 400 in FIG. 4 appears to have a depth, such is merely exemplary of the expansion of the envelope with the container therein. Absent housing a container, the envelope will lie flat. A method of converting the multi-layer media product 100 to the secure envelope 400 is described in connection with FIG. 5 with reference to FIGS. 1-4. It should be readily apparent to those of ordinary skill in the art that the method depicted in FIG. 5 represents a generalized schematic illustration and that other steps may be added or existing steps may be removed or modified. Further, the exemplary steps are in connection with filling and delivery of a prescription from a pharmacy, but other applications will become apparent to those skilled in the art.

During the process 500 of filling a pharmacy order, the multi-layer media product 100 can be printed with pertinent variable information, for example, at step 510. The top of the multi-layer media product, which serves as a detachable script form, can be removed and retained to file within a manual pharmacy filing system at step 520. It will be appreciated that the "top" of the form corresponds to the adhered first sections 216, 316 of the printed layer 200 and liner layer 300. The label die cut mid section can be removed from the multi-layer media product 100 and placed on the container 425 holding the dispensed medication at step 530. It will be appreciated that the mid section corresponds to the adhered second sections 218, 318 of the printed layer 200 and liner layer 300. The section containing the envelope 400 with the clear poly window 150 can be detached from a remainder of the product 100 via the micro perforation 222*b*/322*b* at step 540. It will be appreciated that the envelope 400 corresponds to the adhered third sections 220, 320 of the printed layer 200 and liner layer 300 with the window film 150 therebetween. The labeled prescription container 425 can be placed in the configured envelope 400 at step 550, with the label 224 facing the window so it can be read. The peel strip 226 on the flap 470 of the envelope 400 can be removed to expose the permanent rubber based adhesive 336 at step 560, after which the flap 470 can be folded to seal the envelope 400 at step 570. The front of the envelope 400 (opposite side of the window) therefore contains printed indicia identical to that of the script form retained to file, while the remaining side of the envelope has a copy of the prescription form. Although not depicted in the method, it will be appreciated that the secure envelope containing medication dispensed at the pharmacy, can be safely and securely delivered to a nursing staff and hence patient in a tamper-evident envelope.

It will be appreciated by those of skill in the art that several benefits are achieved by the exemplary embodiments described herein and include provision of one multi-layer media product (form) which contains all pertinent components to administer medication and which eliminates possible printing and merging errors. The multi-layer media product can allow unified printing of variable data needed for a medication label, script form, and security envelope. This unified printing can reduce merge errors related to printing the multiple forms required and aid in the assembling and dispensing of the prescription. The attached see through envelope allows correlation between the medication label information and the script information printed on the envelope without having to remove the medication from the envelope. The sealing mechanism on the envelope protects the medication from tampering while in transport from the pharmacy to the patient floor. By the very nature of the envelope construction, if the medication is tampered with, damage to the envelope will be evident to staff administering medication to a patient. The exemplary multi-layer media product can be optimally printed by Xerox® Phaser® printers.

While the invention has been illustrated with respect to one or more exemplary embodiments, alterations and/or modifications can be made to the illustrated examples without departing from the spirit and scope of the appended claims. In particular, although the method has been described by examples, the steps of the method may be performed in a different order than illustrated or simultaneously. In addition, while a particular feature of the invention may have been disclosed with respect to only one of several embodiments, such feature may be combined with one or more other features of the other embodiments as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." And as used herein, the term "one or more of" with respect to a listing of items such as, for example, "one or more of A and B," means A or B alone, or A and B.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A multi-layered media product comprising:

a printed layer, said printed layer comprising:

three separable sections, each section having an outer surface and an inner surface, a first section including printed indicia on the outer surface, a second section including a die cut label therethrough, and a third section including printed indicia on the outer surface, a die cut peel strip therethrough intermediate the printed indicia and an adjacent section, and a release material on the inner surface in an area defined by the die cut peel strip;

a liner layer aligned and coupled with said printed layer, said liner layer comprising:

three separable sections corresponding to the three separable sections of the printed layer, each section having an outer surface and an inner surface, a first section including an adhesive on the inner surface, a second section including a release material on the inner surface, and the third section including a removable die cut area defining an opening inset from outer edges and including an adhesive adjacent outer edges of the inner surface; and a see-through film sandwiched between inner surfaces of the printed layer and the liner layer at the third sections thereof, the film including an adhesive at outer edges thereof on a face oriented toward the inner surface of the printed layer, wherein the coupled second sections are intermediate the coupled first sections and the coupled third sections, and wherein the coupled first sections provide a detachable prescription, the coupled second sections provide a removable label configured to be adhered to a container, and the coupled third sections provide a sealable envelope configured to receive the container, the coupled first sections being separable from the coupled second sections while the coupled second sections remain joined with the coupled third sections.

2. The product of claim 1, wherein the printed indicia comprises prescription information.

3. The product of claim 1, wherein inner surfaces of the printed layer and liner layer are adhesively coupled.

4. The product of claim 1, wherein the sections are separable along perforations.

5. A method of forming a convertible multi-layered media product comprising:

forming a printed layer, forming said printed layer comprising— forming three separable sections, each section having an outer surface and an inner surface;

printing indicia on the outer surface of a first section;

printing a removable die cut label on the outer surface of a second section;

printing indicia on the outer surface of a third section;

providing a die cut therethough to the third section intermediate the printed indicia and an adjacent section defining a die cut peel strip; and providing a release material on the inner surface of the third section in an area defined by the die cut peel strip; and forming a liner layer and coupling the liner layer with said printed layer, form said liner layer comprising— forming three separable sections corresponding to the three separable sections of the printed layer, each section having an inner surface and an outer surface;

applying an adhesive to the inner surface of a first section;

applying a release layer to an inner surface of a second section;

providing a die cut opening set in from outer edges of a third section;

applying an adhesive adjacent outer edges of the third section inner surface;

providing a see-through film spanning the cut out opening and affixed to the adhesive at the outer edges of the film on a face oriented toward the inner surface of the printed layer, wherein the see-through film is sandwiched between the inner surfaces of the printed layer and liner layer at the third sections thereof, wherein the coupled second sections are intermediate the coupled first sections and the coupled third sections, and wherein the coupled second sections provide a detachable prescription, the coupled second sections provide a removable label configured to be adhered to a container, and the coupled third sections provide sealable envelope configured to receive a container, the coupled first sections being separable from the coupled second seconds while the coupled second sections remain joined the coupled third sections.

6. The method of claim 5, further comprising converting the multi-layer media product to an envelope.

7. The method of claim 5, further comprising converting the multi-layer media product to an envelope formed by detaching each of the adhesively joined first and second sections, removing the peel strip, and folding the flap portion over the outer surface of the printed layer in the third section.

8. The method of claim 5, further comprising converting the multi-layer media product to a product containing envelope.

9. The method of claim 5, further comprising converting the multi-layer media product to a product containing envelope formed by detaching each of the adhesively joined first and second sections, removing the die cut label from the second section, applying the die cut label to a medication container, filling the medication container, inserting the filled and labeled medication container into the envelope between the see-through film and printed layer, removing the peel strip, and folding the flap portion over the outer surface of the printed layer in the third section.

10. The method of claim 5, wherein printing indicia comprises printing prescription information.

11. The method of claim 5, further adhesively coupling inner surfaces of the printed layer and liner layer.

12. The method of claim 5, further comprising separating sections along perforations.

* * * * *